United States Patent [19]

Otsubo

[11] Patent Number: 4,495,137

[45] Date of Patent: Jan. 22, 1985

[54] NUCLEAR REACTOR

[75] Inventor: Akira Otsubo, Kashiwa, Japan

[73] Assignee: Doryokuro Kakunenryo Kaihatsu Jigyodan, Tokyo, Japan

[21] Appl. No.: 333,185

[22] Filed: Dec. 21, 1981

[30] Foreign Application Priority Data

Jan. 21, 1981 [JP] Japan .................................. 56-7336
Mar. 16, 1981 [JP] Japan .................................. 56-37627

[51] Int. Cl.³ ....................... G21C 13/00; G21C 17/00
[52] U.S. Cl. .................................... 376/171; 376/205; 376/250; 376/247; 376/294
[58] Field of Search ............................... 376/203–206, 376/250, 247, 403, 294, 171

[56] References Cited

U.S. PATENT DOCUMENTS

| | | | |
|---|---|---|---|
| 2,942,615 | 6/1960 | Dayton | 376/203 |
| 2,991,905 | 7/1961 | Monson et al. | 376/203 |
| 2,995,505 | 8/1961 | Guild | 376/206 |
| 4,076,585 | 2/1978 | Cachera | 376/250 |
| 4,116,766 | 4/1978 | Poindexter et al. | 376/203 |
| 4,321,110 | 3/1982 | Nickel et al. | 376/250 |
| 4,326,920 | 4/1982 | Facha et al. | 376/205 |
| 4,363,777 | 12/1982 | Cornu et al. | 376/203 |
| 4,401,619 | 8/1983 | McEdwards | 376/206 |
| 4,406,855 | 9/1983 | Schwiers et al. | 376/250 |

FOREIGN PATENT DOCUMENTS

| | | | |
|---|---|---|---|
| 50-23119 | 5/1975 | Japan | 376/206 |
| 929784 | 6/1963 | United Kingdom | 376/250 |

*Primary Examiner*—Sal Cangialosi
*Attorney, Agent, or Firm*—Wenderoth, Lind & Ponack

[57] ABSTRACT

A nuclear reactor in which the space between a reactor vessel and a guard vessel disposed outside the reactor vessel is kept in a pressurized, sealed state. The sealed space and the space outside the guard vessel are communicate only through a liquid manometer structure, which is kept sealed with liquid.

15 Claims, 8 Drawing Figures

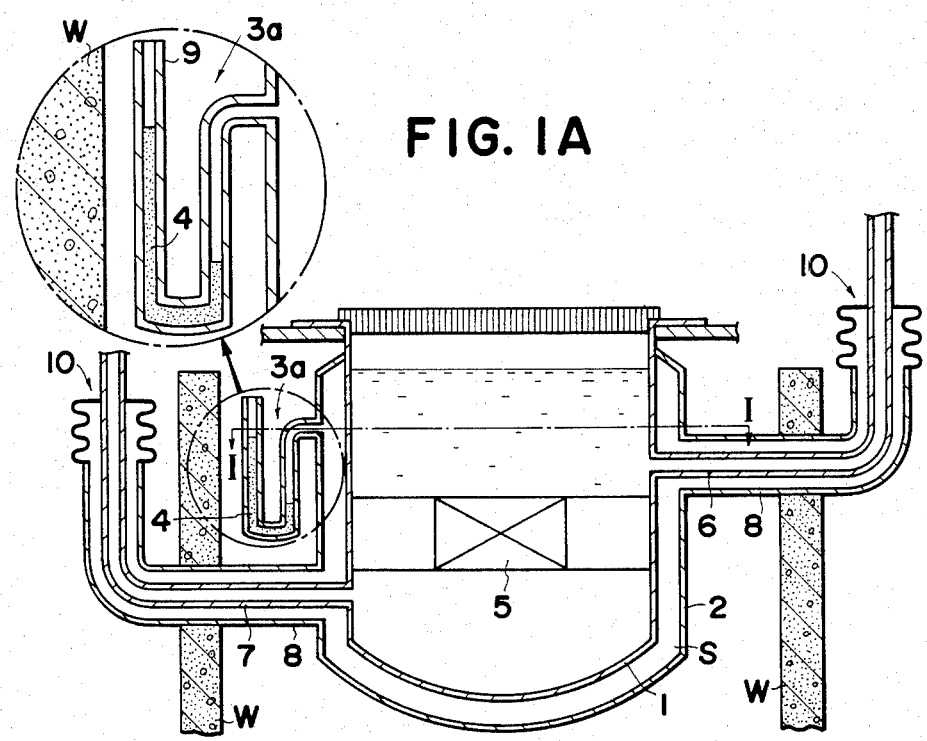
FIG. IA
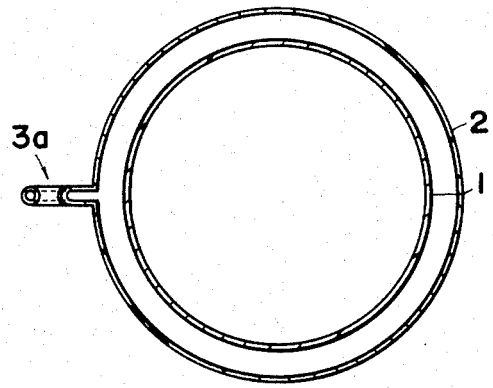
FIG. IB

NUCLEAR REACTOR

BACKGROUND OF THE INVENTION

This invention relates to nuclear reactors in general, and specifically to loop type and pool type fast breaders. More particularly, the present invention relates to a nuclear reactor of the loop type in which the space between a reactor vessel and a guard vessel disposed outside the reactor vessel is kept in a pressurized sealed state.

In a pool type reactor, the space to be sealed according to the present invention is defined between a main vessel and a safety vessel disposed outside the main vessel. However, for the sake of simplicity, the terms "reactor vessel" and "guard vessel" used hereinafter include also such main vessel and safety vessel, respectively, in the pool type reactor.

Conventionally, a guard vessel has been disposed outside a reactor vessel or tank. Since this guard vessel merely encompasses the reactor vessel, the space around the reactor vessel is kept at a pressure substantially equal to atmospheric pressure, and hence is kept open, in a sense. If, by any chance, damage to piping in a primary cooling system, or a core disassembly accident occurs in such a reactor, wide dispersion of radioactive substances would result. (Though every kind of safety measure has been taken in the reactor to prevent such an accident, it could be hypothetically or provisionally considered.)

This problem can be solved by keeping the space between the guard vessel and the reactor vessel in a sealed state. According to the sealed arrangement, dispersion of the nuclear fuel materials, fission products and coolants to the outside can be reliably prevented even if the reactor vessel or the piping in the primary cooling system disposed near the reactor vessel is damaged.

One possible method of fixing the reactor vessel and the guard vessel to each other in a sealed state is to employ bellows means between them. However, the major problem in using bellows is that bellows have a predetermined service life and must be replaced when broken. Disposing such bellows means near the reactor vessel inside a biological shield is not desirable, since a man cannot enter the biological shield when once the operation of the reactor is started.

Another method of fixing the guard vessel to the reactor vessel in a sealed state would be welding. When the guard vessel is to be welded to the outside of the reactor vessel, however, it is not possible to weld all the portions to be welded from both inside and outside of the guard vessel. Namely, welding from outside all the portions of the guard vessel is of course possible, but when the inside of the guard vessel is welded, an exit portion for the welders and welding tools from the guard vessel must be left open and such exit portion cannot be welded from inside of the guard vessel. If there exists any weld portion welded only from outside, the reliability of the seal at that weld portion is lowered remarkably, thus reducing the overall reactor reliability.

SUMMARY OF THE INVENTION

It is an object of the present invention to provide a nuclear reactor having a high level of safety in which the space between a reactor vessel and a guard vessel is kept under a highly reliable seal.

To accomplish this object, according to the present invention, there is provided a nuclear reactor in which the space between a reactor vessel and a guard vessel disposed outside the reactor vessel is kept in a sealed state. The space between the reactor vessel and the guard vessel communicates with the space outside the guard vessel through a liquid manometer structure, and the manometer structure is filled with a liquid so as to provide a liquid-sealed arrangement.

In accordance with a preferred embodiment of the present invention, an inert gas or the like is charged in the sealed space between the reactor vessel and the guard vessel to keep the space in a pressurized state. This construction makes it possible to restrict the flow rate of reactor contents such as coolant or the like which flow from the damaged portion when the reactor vessel or the piping in the primary cooling system is broken, and to prevent the occurrence of an accident or escalation of the accident in case an accident does occur.

In accordance with another embodiment of the present invention, a tag gas is charged in the sealed space between the reactor vessel and the guard vessel to keep the space in a pressurized state. By continuously monitoring whether or not the tag gas leaks from the sealed space, soundness of the reactor vessel, the guard vessel, the piping in the primary cooling system and the like, can be continuously inspected even during operation of the reactor. This further enhances the safety of the nuclear reactor itself.

Hereinafter, preferred embodiments of the present invention will be described with reference to he accompanying drawings.

BRIEF DESCRIPTION OF THE DRAWINGS

FIG. 1A is a schematic view showing an embodiment of the present invention;

FIG. 1B is a sectional view taken along line I—I of FIG. 1A;

DESCRIPTION OF THE PREFERRED EMBODIMENTS

Figure 2:
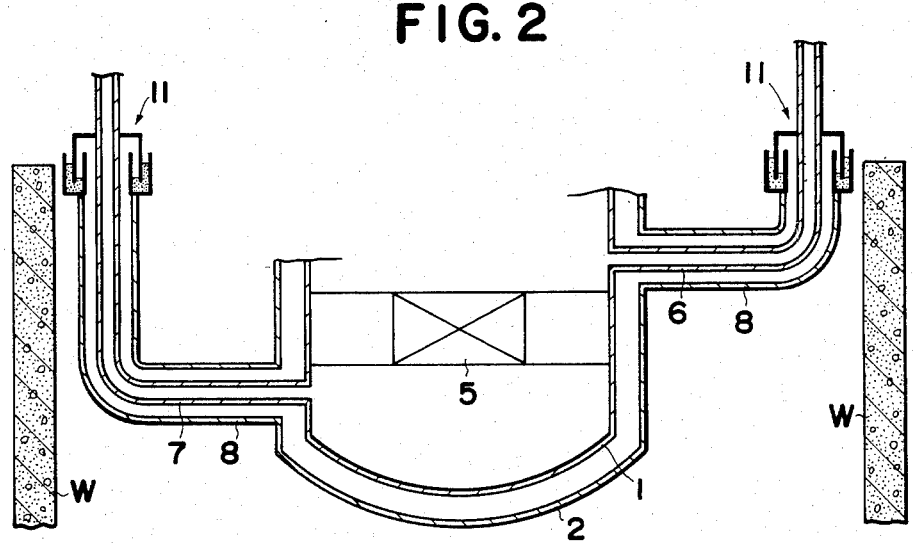
FIG. 2 is a schematic view showing an embodiment of a sealing means between piping in a primary cooling system and a guard pipe.

FIG. 1A and 1B are schematic views showing an embodiment of the present invention. The outside of a reactor vessel 1 is surrounded by a guard vessel 2 with a predetermined distance therebetween, and a liquid manometer structure 3a is mounted on the guard vessel 2. The space S between the reactor vessel 1 and the guard vessel 2 is communicated with the external space only through the manometer structure 3a. When a sealing liquid 4 fills the manoeter structure 3a, the space S inside the guard vessel 2 is perfectly sealed. Reference numeral 5 represents a reactor core.

In this embodiment, a substantially U-shaped pipe (generally, a large diameter pipe of stainless steel), which has a sufficient inner diameter to permit welders and welding tools to pass through, is employed for the liquid manometer structure 3a. To produce the arrangement of this embodiment in practice, the guard vessel 2 is first welded where necessary to the reactor vessel 1 from both outside and inside, and the U-shaped pipe or the manometer structure 3a, is then reliably welded to the upper part of the outer surface of the guard vessel 2. After the welding is finished, the welders and the welding tools can leave through the inside of the U-shaped pipe 3a, which is subsequently filled with the sealing liquid 4. In this manner, a highly reliably sealed space S can be formed between the reactor vessel 1 and the guard vessel 2. Even when the sealed space S is pressurized, the U-shaped pipe 3a establishes a balance between the pressures inside and outside of the space due to the principle of a liquid manometer. It is therefore necessary to decide upon the length of a rising pipe 9 outside the U-shaped pipe 3a in consideration of the rise of the liquid level. Metals which remain in a liquid state under the conditions of use, such as low-temperature melting alloys, may be used as the sealing liquid 4, but liquid metals having a high specific gravity such as mercury can also be used advantageously.

To bring the space S between the reactor vessel and the guard vessel into a pressurized state, inert gases of the like can be charged into the space.

Incidentally, in the case of a loop type reactor, the piping in the primary cooling system close to the reactor vessel main body, that is, a coolant outlet pipe 6 and a coolant inlet pipe 7, are also surrounded by a guard pipe 8 connected to the guard vessel 2. In the present invention, the space between these coolant pipes 6 and 7 and the guard pipe 8 is also sealed. Since these coolant pipes 6 and 7 and the guard pipe 8 can be extended to the outside of a biological shield W, however, the space between these coolant pipes and the guard pipe can be sealed by using conventionally known bellows 10 outside the shield W. Since the bellows portion 10 is disposed outside the shield W, it can be replaced whenever necessary. As the diameter of each of the coolant pipes 6 and 7 is far smaller than the diameter of the reactor vessel, the space between the pipes 6 and 7 and the guard pipe 8 could be liquid-sealed relatively easily using a small annular liquid manometer structure 11 as shown in FIG. 2. When such a small but reliable annular manometer structure 11 is employed, the space between the coolant pipes and the guard pipe can be sealed inside the shield W, as shown in FIG. 2.

Next, FIGS. 3A and 3B and FIGS. 4A and 4B show other embodiments of the present invention, respectively. In these embodiments, the liquid manometer structure 3b and 3c are disposed around the entire circumference of the upper portions of the reactor vessel 1 and guard vessel 2.

In these embodiments, since the construction other than the liquid manometer structure is the same as that of the embodiment shown in FIGS. 1A and 1B, like reference numerals are used to identify like constituent elements and their explanation is omitted.

Figure 3A:
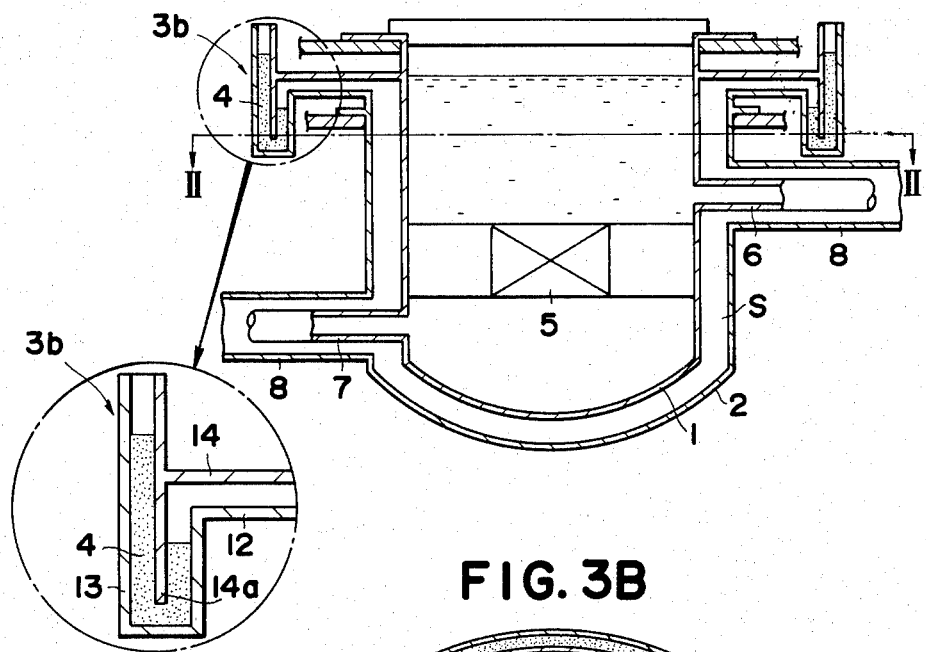
FIG. 3A is a schematic view showing another embodiment of the present invention.
Figure 3B:
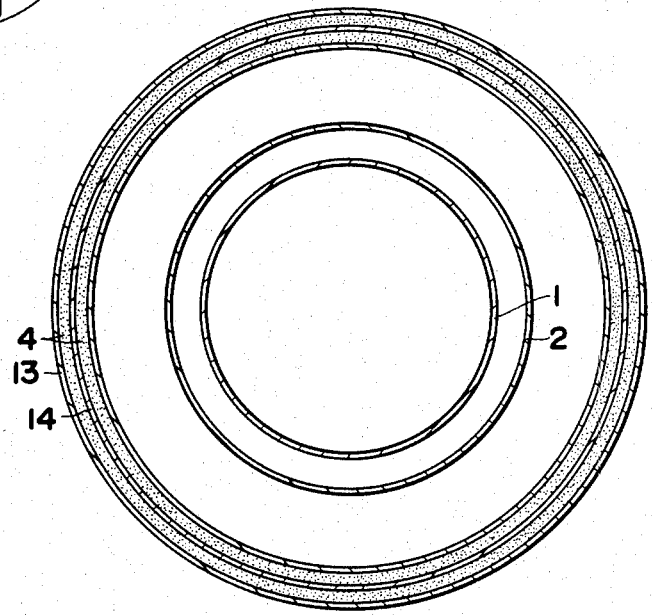
FIG. 3B is a sectional view taken along line II—II of FIG. 3A.

In the embodiment shown in FIGS. 3A and 3B, an annular flange 12 is formed extending outward from the upper peripheral edge of the guard vessel 2 in the horizontal direction, and the tip of this flange portion 12 is shaped into a groove 13 having a substantially U-shaped cross section. An annular member 14 having an inverted L-shaped cross section or a sideways T-shaped cross section is also formed extending outward from the outer circumferential surface of the reactor vessel 1 in the horizontal direction above the extending flange portion 12. The lower end portion 14a of the annular member 14 is inserted into the U-shaped groove 13 so that both members 12 and 14 are coupled with each other and a gap is maintained between the lower end portion 14a and the U-shaped groove 13. According to this arrangement, the liquid manometer structure 3b can be formed around the entire circumference at a position separated from the reactor vessel 1.

Figure 4A:
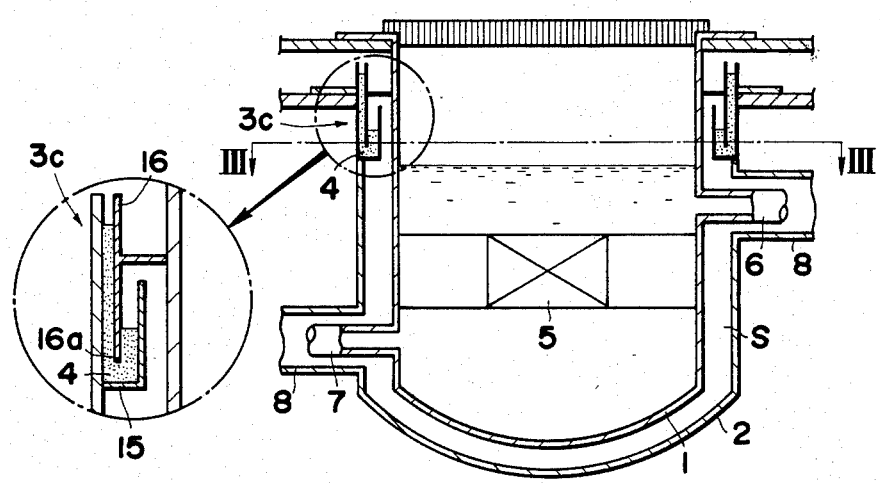
FIG. 4A is a schematic view showing still another embodiment of the present invention.
Figure 4B:
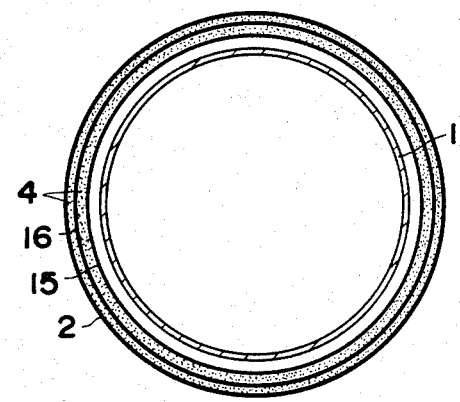
FIG. 4B is a sectional view taken along line III—III of FIG. 4A.

In contrast, FIGS. 4A and 4B show an embodiment in which the liquid manometer sturcture 3c is formed close to the reactor vessel 1. An annular member 15 having an L-shaped cross section is disposed on the inner circumference at the upper portion of the guard vessel 2 so as to define a groove structure. On the other side, an annular member 16 having an inverted L-shaped cross section or a sideways T-shaped cross section is disposed around the outer circumference of the reactor vessel 1, and these members 15 and 16 are fit together so as to leave a gap between the lower end 16a of the member 16 and the member 15, thereby forming the liquid manometer structure 3c.

Besides the abovementioned liquid manometer structures, various other structures may also be used in the present invention. For instance, the liquid manometer structure 3e in the embodiment shown in FIG. 5 consists of an annular member 17 having an L-shaped cross section disposed around the outer circumference at the upper portion of the guard vessel 2 so as to define a groove structure, and an annular member 18 having an inverted L-shaped cross section or a sideways T-shaped cross section disposed around the outer circumference of the reactor vessel 1, both members 17 and 18 being combined with each other to form the liquid manometer structure 3e.

Figure 5:
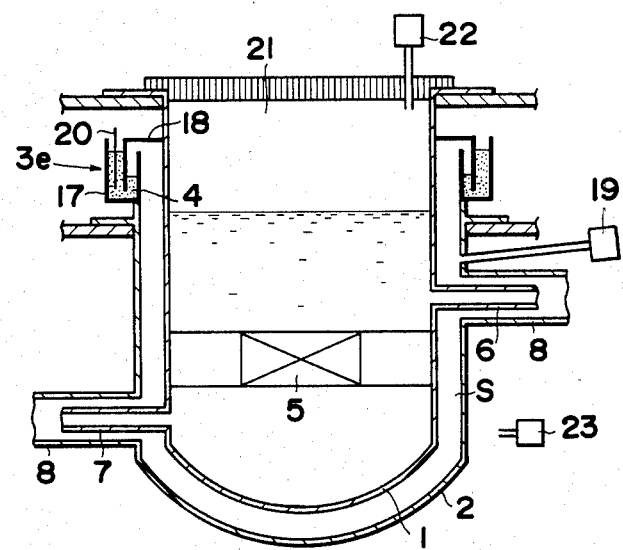
FIG. 5 is a schematic view of an embodiment of the present invention which makes use of a tag gas.

According to the construction shown in FIGS 3A, 4A and 5, no welded portion exists between the reactor vessel 1 and the guard vessel 2, so the sealed space S that is formed therebetween can have especially high reliability. In the nuclear reactor having such a construction, the reactor vessel 1 and the guard vessel 2 are combined with each other only via the liquid-sealed portion, so that no stress transfered between the two vessels, which is especially desirable for the reactor arrangement.

When the nuclear reactor is a fast breeder, the temperature is likely to exceed 300° C. in the proximity of the reactor vessel 1 and guard vessel 2 at the cover gas region in FIGS. 4A and 5. When exposed to such a temperature, the liquid which fills in the manometer structure of the present invention would likely evaporate. In order to prevent the evaporation of the sealing liquid, heat insulating materials or cooling means may be additionally provided lest the heat of the reactor vessel directly affect the liquid manometer structure.

When the sealed space S defined between the reactor vessel 1 and the guard vessel 2 is brought into the pressurized state, the pressure may be kept substantially equal to the pressure inside the reactor vessel. However, the pressure need not always be equal to the internal pressure of the reactor vessel. In a pressurized state of about 1.5 to about 3 atms of the absolute pressure, leakage of coolant from damaged portions of the reactor vessel and the piping in the primary cooling system can be markedly reduced. Accordingly, even if a coolant leakage occurs, the flow rate of the coolant inside the core can be kept substantially equal to the flow rate during normal operation of the reactor and damage to the core can be prevented. Thus, it becomes possible to prevent possible accidents.

In addition, when the pressure change inside the sealed and pressurized space S is monitored by using a pressure gauge and the like, the occurrence of an accident can be detected.

If a tag gas is charged into the sealed space S defined between the reactor vessel 1 and the guard vessel 2 to bring the space S into a pressurized state, the occurrence of an accident can be quickly detected by monitoring leakage of the tag gas from a crack when such is generated in the reactor vessel, in the guard vessel or in the piping in the primary coolant system.

FIG. 5 shows a preferred embodiment for monitoring leakage of the tag gas. Namely, the space S between the reactor vessel 1 and the guard vessel is sealed by the liquid manometer structure 3e and the tag gas fills the space S. A pressure gauge 19 is disposed in order to measure the internal pressure of the sealed space S. A level meter 20 is immersed in the liquid 4 of the manometer structure 3e. Further, tag gas detection means 22 and 23 are positioned in the atmospheric region in an upper cover gas space 21 within the reactor vessel 1 and outside the guard vessel 2, respectively. Since the rest of the construction is substantially the same as that of the embodiment shown in FIG. 1, like reference numerals are used to identify like constituents and the explanation of these members are omitted.

When damage such as a crack occurs in the reactor vessel 1 or in the pipes 6 and 7 in the primary cooling system connected to the reactor vessel, the tag gas charged in the space S comes into the reactor vessel 1 from the damaged portion and leaks into the cover gas space 21 at the upper part of the reactor vessel or into a cover gas space (not shown) in an instrument installed in the primary cooling system. The tag gas is immediately detected by the tag gas detection means, e.g. means 22 disposed inside the cover gas space 21, so that the damage of the reactor vessel 1 can be detected at an early stage. If damage develops on the guard vessel 2, the tag gas leaks to the external region and is likewise detected by the detection means 23 for the tag gas. The leakage of the tag gas can be detected most conveniently by charging such a tag gas at a predetermined pressure within the range of, for example, about 1.5 to about 3 atms (absolute pressure) into the sealed space S, and by measuring the pressure change inside the space S by the pressure gauge 19 mounted on the guard vessel 2. The pressure change inside the space S can also be supervised by measuring the level change of the liquid 4 of the manometer structure 3e by the level meter 20. In measuring the pressure change, it is necessary to compensate for the volume change of the tag gas due to any temperature change inside the space S. On the basis of the pressure measurement by the pressure gauge 19 and level meter 20 and the result of tag gas leak detection by the detection means 22, 23, it becomes possible to always determine accurately whether or not damage to the reactor vessel or the guard vessel has occured.

As can be understood from the foregoing, either one of the pressure gauge 19 and level meter 20 may be provided, or both may be disposed conjointly. It is not always necessary to provide both pressure gauge 10 or level meter 20 and detection means 22, 23 for the tag gas. Either one may be provided.

The tag gas to be charged into the sealed space S is preferably an inert gas such as helium, other rare gases, or mixtures thereof.

Any means may be employed as the detection means 22, 23 for the tag gas employed, so long as they are capable of detecting the presence of the gas, but it is generally preferred to employ a gas sampling device and a mass spectrometer associated with the device. In this case, the tag gas preferably contains such a component that can be sharply sensed by the mass spectrometer. The leakage of the tag gas can be supervised rapidly and reliably if a rare gas containing its specific stable isotope or a gas mixture containing isotopes in a specific mixing ratio is used as the tag gas. Examples of the stable isotopes of the rare gases include neon 20, neon 21 and neon 22. These examples are merely illustrative and not restrictive in any manner.

In contrast to the abovementioned construction, it is also possible to keep the sealed space S between the guard vessel and the reactor vessel under negative pressure and to dispose the gas detection means inside the sealed space S so that a crack in the guard vessel is detected by detecting the leakage of gas from the external region into the sealed space S.

As described in detail in the foregoing, in the nuclear reactor in accordance with the present invention, the space between the reactor vessel and the guard vessel is kept in a reliably sealed and pressurized state. Accordingly, reactor damage in the cases of a core disassembly accident, that can be assumed theoretically, and breakage accidents on the reactor vessel or the piping in the primary cooling system can be largely reduced, and the safely of the reactor can be markedly improved.

In addition, by filling the tag gas in the sealed space to bring the space into a pressurized state and by detecting the leakage of the tag gas from the sealed space, the occurence of accident, or damage to the reactor vessel, the guard vessel, the piping in the primary cooling system and the like can always be quickly detected even during reactor operation.

While the invention has been described with respect to preferred embodiments, it should be apparent to those skilled in the art that numerous modifications may be made thereto without departing from the spirit and scope of the invention.

What is claimed is:

1. A fast breeder reactor comprising:
   a reactor vessel;
   a guard vessel enclosing said reactor vessel, spaced a predetermined distance from said reactor vessel; and
   a liquid manometer structure, the space defined between said reactor vessel and said guard vessel communicating with the exterior of said guard vessel only through said liquid manometer structure, said manometer structure being filled with a liquid so as to liquid-seal said space between said reactor vessel and said guard vessel with respect to the exterior of said guard vessel said space between said reaction vessel and said guard vessel being charged with an inert gas so as to maintain said space at a pressure substantially greater than atmospheric pressure.

2. A fast breeder reactor according to claim 1, wherein said liquid manometer structure comprises a substantially U-shaped tube welded to a part of the outer circumferential surface of said guard vessel, said tube having an inner diameter sufficiently large enough to permit the passage of welders and welding tools therethrough.

3. The fast breeder reactor according to claim 1, wherein said liquid filling said liquid manometer structure is mercury.

4. The fast breeder reactor according to claim 1, wherein the pressure of said inert gas charged into said sealed space is about 1.5 to about 3 atms absoluted pressure.

5. A fast breeder reactor according to claim 1, wherein said liquid manometer structure comprises:
- an annular flange extending horizontally from the outer periphery of said guard vessel at the upper end thereof, said annular flange having a radially outer portion having spaced apart vertical sidewalls and a substantially U-shaped cross section; and
- an annular member extending horizontally from the outer periphery of said reactor vessel at a position above said flange and having an inverted L-shaped cross section;
- said annular flange and said annular member being combined with each other in such a manner that the lower end of said annular member is inserted between said sidewalls, said space communicating with the exterior of said guard vessel between said annular flange and said annular member.

6. The fast breeder reactor according to claim 1, wherein said liquid manometer structure comprises:
- an annular flange extending horizontally from the outer periphery of said guard vessel at the upper end thereof, said annular flange having a radially outer portion having spaced apart vertical sidewalls and a substantially U-shaped cross section; and
- an annular member extending horizontally from the outer periphery of said reactor vessel at a position above said flange and having a sideways turned T-shaped cross section;
- said annular flange and said annular member being combined with each other in such a manner that the lower end of said annular member is inserted between said sidewalls, said space communicating with the exterior of said guard vessel between said annular flange and said annular member.

7. The fast breeder according to claim 1, wherein said liquid manometer structure comprises:
- an annular flange fitted to the inner peripheral surface of said guard vessel at the upper end thereof, and having an inverted L-shaped cross section; and
- an annular member fitted to the outer peripheral surface of said reactor vessel at the upper end thereof, and having an inverted L-shaped cross section;
- said annular flange and said annular member being combined with each other in such a manner that said space communicates with the exterior of said guard vessel between the lower end of said annular member and said annular flange.

8. The fast breeder reactor according to claim 1, wherein said liquid manometer structure comprises:
- an annular flange fitted in the innner peripheral surface of said guard vesel at the upper end thereof, and having an inverted L-shaped cross section; and
- an annular member fitted to the outer peripheral surface of said reactor vessel at the upper end thereof, and having a sideways turned T-shaped cross section;
- said annular flange and said annular member being combined with each other in such a manner that said space communicates with the exterior of said guard vessel between the lower end of said annular member and said annular flange.

9. The fast breeder reactor according to claim 1, wherein said inert gas charged in said sealed space between said reactor vessel and said guard vessel comprises a tag gas, said reactor further including means for monitoring leakage of said tag gas from said sealed space.

10. The fast breeder reactor according to claim 9, wherein said means for monitoring leakage of said tag gas comprises means for detecting a pressure change inside said sealed space.

11. The fast breeder reactor according to claim 9, further comprising a cover gas space inside said reactor vessel, wherein said means for monitoring leakage of said tag gas comprises tag gas detection means, disposed in said cover gas space, for detecting leakage of said tag gas into said cover gas space.

12. The fast breeder reactor according to claim 9, wherein said means for monitoring leakage of said tag gas comprises tag gas detection means, disposed outside said guard vessel, for detecting leakage of said tag gas to ouside said guard vessel.

13. The fast breeder reactor according to claim 9, wherein said tag gas is helium.

14. The fast breeder reactor according to claim 9, wherein said tag gas is a gas containing therein a stable isotope of a rare gas.

15. The fast breeder reactor according to claim 11 or 12, wherein said tag gas detection means comprises a mass spectrometer and a gas sampling device cooperating therewith.

* * * * *